July 13, 1954 D. A. McCAULAY ET AL 2,683,761
XYLENE DISPROPORTIONATION
Filed April 30, 1952
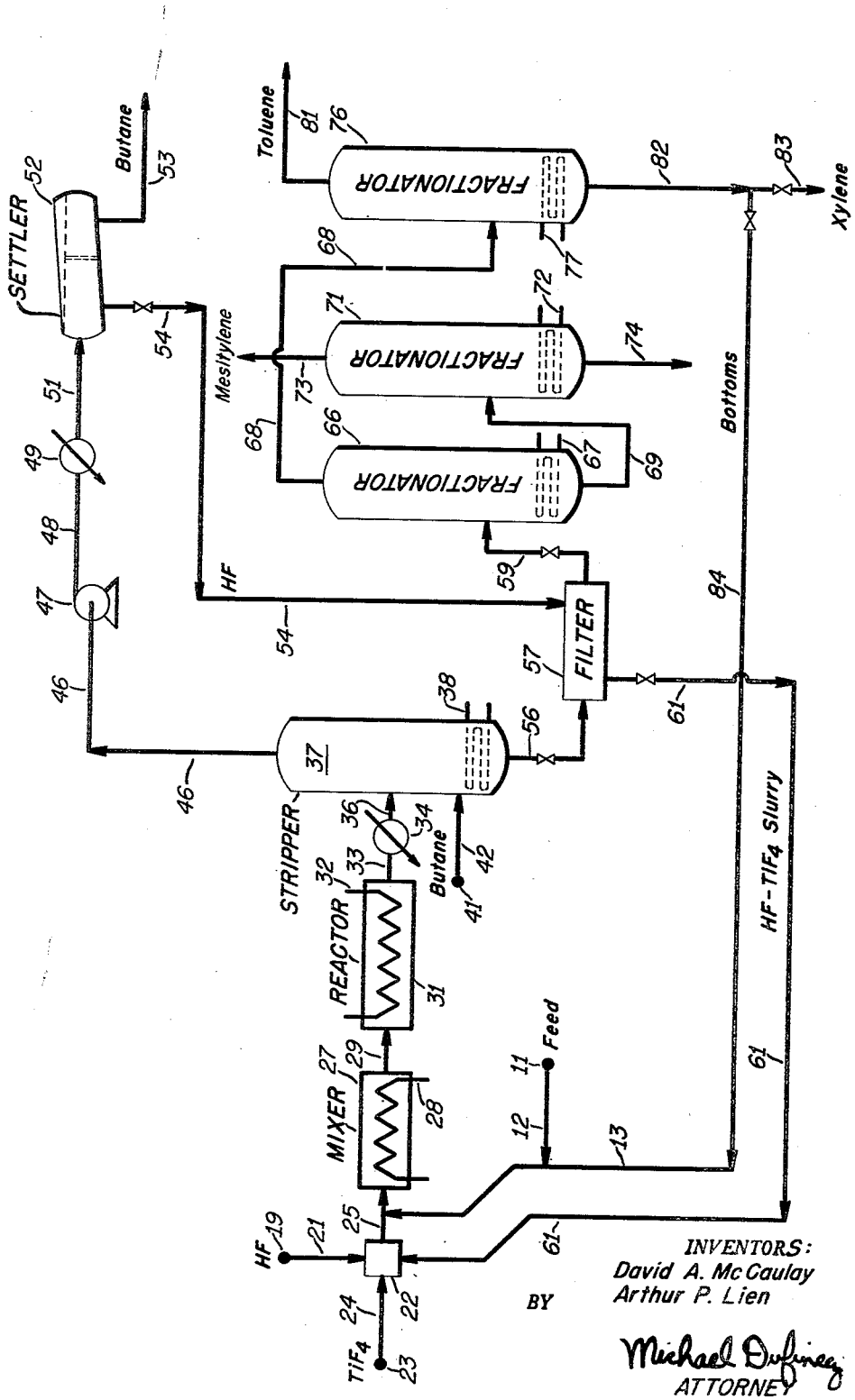
INVENTORS:
David A. McCaulay
Arthur P. Lien
BY Michael Dufiney
ATTORNEY Patented July 13, 1954

2,683,761

UNITED STATES PATENT OFFICE 2,683,761

XYLENE DISPROPORTIONATION

David A. McCaulay, Chicago, Ill., and Arthur P. Lien, Highland, Ind., assignors to Standard Oil Company, Chicago, Ill., a corporation of Indiana Application April 30, 1952, Serial No. 285,212

18 Claims. (Cl. 260—671)

This invention relates to the disproportionation of xylenes. More particularly, it relates to the preparation of trimethylbenzenes by the disproportionation of a xylene or a mixture of xylenes. Still more particularly, the invention relates to the preparation of high purity mesitylene.

The production of alkyd type resins and plastics has created a large demand for aromatic polycarboxylic acids. Particularly valuable for these uses is 1,3,5-benzene tricarboxylic acid which can be prepared by the oxidation of mesitylene. Trimethylbenzenes and mesitylene in particular are valuable components of high octane fuels. Of all the hydrocarbons tested, mesitylene is among the highest in clear CFR–R octane number. Mesitylene is isomeric with cumene which was extensively used as a high octane number aviation gasoline component; these two compounds are very similar in physical properties.

An object of this invention is the production of trimethylbenzenes by the disproportionation of xylene. Another object of this invention is the preparation of high purity mesitylene by the disproportionation of xylene or a mixture of xylenes. Other objects will be apparent as the detailed description of the invention proceeds.

These objects are attained by contacting xylene with liquid HF and titanium tetrafluoride at a temperature above 185° F. for a time sufficient to convert an appreciable amount of the feed xylene to trimethylbenzene, and separating the HF and TiF$_4$ from the hydrocarbon product and recovering trimethylbenzenes from the hydrocarbon product. Further, it has been discovered that high purity mesitylene can be produced by contacting xylene with sufficient liquid HF and TiF$_4$ to produce a single homogeneous phase of HF, TiF$_4$ and xylene, at a temperature above 185° F., preferably between about 225° and 325° F. for a time sufficient to convert an appreciable amount of the feed xylene to the desired mesitylene and recover high purity mesitylene from the HF, TiF$_4$ and other hydrocarbon products.

It has been previously discovered that polyalkylbenzenes, such as, xylene, diethylbenzene, ethylxylene, and trimethylbenzene react with liquid HF and TiF$_4$ to form complexes containing 2 mols of TiF$_4$ and probably 1 mol of HF for each mol of polyalkylbenzene. It is believed that HF is present in the complex because no complex is formed between TiF$_4$ and xylene in the absence of liquid HF. Under the conditions of this process benzene, toluene and ethylbenzene do not form a complex with TiF$_4$ and liquid HF. The complex is extremely soluble in liquid HF. Sufficient liquid HF must be present in the reaction zone to form the complex and also to dissolve the complex itself.

The liquid HF used in the process should be substantially anhydrous, i. e., the liquid HF should not contain more than about 1 to 2% of water. The amount of liquid HF needed in the process is between at least about 2 mols and about 50 mols per mol of xylene present in the feed. Put in another way, the amount of liquid HF used should be between about 40 and 1,000 volume percent, based on xylene. Preferably, the liquid HF should be between about 100 and 500 volume percent.

The presence of a TiF$_4$-HF-xylene complex in the liquid HF markedly increases the solubility of non-complexible aromatics in the liquid HF; examples of non-complexible aromatics are benzene, toluene and ethylbenzene. Apparently the complex acts as a solubility promoter for the non-complexible aromatic hydrocarbons because the amount of these aromatic hydrocarbons which can be dissolved increases with increase in the amount of complex present in the liquid HF. Liquid HF and TiF$_4$ rapidly disproportionate ethylbenzene to diethylbenzene; the diethylbenzene complexes with TiF$_4$ and HF and passes into solution in the form of a complex, thereby resulting in an apparent increase in solubility of ethylbenzene.

If, as taught in our copending application, Serial Number 285,211, filed April 30, 1952, the mixed xylenes, particularly mixtures of ortho- and para-xylene, are contacted with HF·TiF$_4$ in mol ratio of about 2 mols of TiF$_4$ per mol of xylenes at temperatures below 185° F., the predominant reaction is isomerization of the xylenes to meta-xylene. However, if higher temperatures are used disproportionation to trimethylbenzenes becomes the predominant reaction.

Appreciable amounts of trimethylbenzene also can be produced when using only slight amounts of TiF$_4$ at temperatures above 185° F. However, the degree of conversion to trimethylbenzene increases with increase in amount of TiF$_4$ present. The amount of TiF$_4$ used may be from about 0.1 mol per mol of xylene in the feed to as much as 4 or 5 mols. Hereinafter the abbreviated term, mols of TiF$_4$, is used to designate mols of TiF$_4$ per mol of xylene in the feed. It is preferred to limit the use of TiF$_4$ to the amount that will be present in the HF, either in the form of a complex, or in physical solution therein. The presence of a separate solid phase of TiF$_4$ is undesirable because the solid TiF$_4$ appears to promote more extreme disproportionation to tetramethylbenzene. When operating on a mixture of C$_8$ aromatic hydrocarbons, it is preferred to add to the reaction zone sufficient incremental TiF$_4$ to complex with the diethylbenzene produced by disproportionation of ethylbenzene, i. e., about 1 mol of TiF$_4$ per mol of ethylbenzene in the feed. The degree of conversion to trimethylbenzenes is decreased when two liquid phases are present in the reaction zone. It has been found that the total reaction product will not contain meta-xylene in an amount substantially in excess of the thermodynamic equilibrium, about 60 mol percent based on xylene, when two liquid phases are present in the reaction zone. By two liquid phases, it is intended to mean an HF-rich phase comprising liquid HF, complex, dissolved aromatic hydrocarbons and dissolved $TiF_4$, and a hydrocarbon phase comprising non-complexed hydrocarbons as well as non-complexible hydrocarbons, such as, paraffinic hydrocarbons, benzene, toluene and ethylbenzene. Even in the absence of non-complexible hydrocarbons, the presence of the second liquid phase has an adverse effect on the degree of conversion obtainable. It has been found that best results are attainable in this process when the operation is carried out in a single homogeneous liquid phase, i. e., when all the feed hydrocarbons and substantially all the $TiF_4$ are dissolved in the HF-rich phase either as a complex, or in physical solution. In order to attain a single homogeneous phase, it is necessary to use about 1.7 mols of $TiF_4$ per mol of xylene present in the feed (and about 1 mol of $TiF_4$ per mol of ethylbenzene present in the feed); in general, optimum results will be attained when about 2 mols of $TiF_4$ are used per mol of xylene in the feed.

It has further been discovered that when operating the process in a single liquid homogeneous phase, the trimethylbenzene portion of the product hydrocarbons is a high purity 1,3,5-trimethylbenzene, i. e., mesitylene. By high purity, it is intended to mean in excess of 90 mol percent. However, under some conditions, the trimethylbenzene fraction contains only trace amounts of the isomers other than mesitylene.

The temperature at which the treatment is carried out is of importance in the degree of conversion attained and the yield of undesired by-products such as $C_{10}$ aromatic hydrocarbons. In order to attain a degree of conversion in excess of about 10 mol percent, based on total product hydrocarbons, it is necessary to operate the process at a temperature above 185° F. The degree of conversion and particularly the relative amount of the desired mesitylene, increases with increase in temperature; the process may be operated at temperatures as high as 500 or 600° F. At these high temperatures disproportionation to $C_{10}$ aromatic hydrocarbons and cracking reactions occur, which limit the commercial practicability of the process. It is preferred to operate at a temperature between about 225° and 325° F.

The time for which the reaction must be carried out is related to the temperature at which the reaction is being carried out; the higher the temperature, the shorter the time necessary to reach an equivalent degree of conversion. Prolonged reaction times are not desirable because it appears that the amount of trimethylbenzene produced reaches an equilibrium in a given time and then side reactions continue, which consume feed xylene without increase in yield of trimethylbenzene. When operating between about 225° and 325° F., suitable contacting times are between about 5 minutes and 60 minutes, the longer time corresponding to the lower temperature. In general shorter reaction times may be used when operating with a single homogeneous liquid phase.

The feed to this process may consist of a mixture of $C_8$ aromatic hydrocarbons and non-aromatic hydrocarbons, e. g., a narrow boiling range cut obtained from petroleum distillate or from the so-called hydroforming of petroleum distillates; or the feed to the process may consist of a mixture of $C_8$ aromatic hydrocarbons substantially free of other hydrocarbons; or the feed may consist predominantly of any one of the three xylenes. The presence of non-complexible aromatic hydrocarbons and paraffinic hydrocarbons has an adverse effect on the degree of conversion attainable. These non-complexible hydrocarbons extract from the HF phase some of the un-complexed xylenes and also some of the complexed xylenes. Even when a high degree of intermingling of the two phases is obtained, substantially no conversion of the xylenes occurs in the hydrocarbon phase. The presence of benzene and/or toluene in the HF phase in an amount in excess of that resulting from the disproportionation reaction is detrimental to conversion to trimethylbenzene; the feed, preferably, should not contain appreciable amounts of benzene and/or toluene. It is preferred to operate on a feed stock comprising essentially xylene, a mixture of xylenes, or a mixture of $C_8$ aromatic hydrocarbons.

The accompanying figure shows one embodiment of this process for the production of a high purity mesitylene by the disproportionation of the xylenes contained in a mixture of $C_8$ hydrocarbons. It is to be understood that this embodiment is shown for purposes of illustration only and that many other variations of this process can be readily devised by those skilled in the art. It is to be further understood that pumps, numerous valves and other pieces of process equipment have been omitted because these can be readily supplied to the embodiment by those skilled in the art.

In this illustration the charge consists of a mixture of orthoxylene, meta-xylene, para-xylene and ethylbenzene which was derived from the product of the hydroforming of a virgin naphtha. The charge contains about 45% of ortho and para-xylene, 15% of ethylbenzene and the remainder meta-xylene. The feed from source 11 is passed through line 12 into line 13.

Liquid HF from source 19 is passed by way of line 21 into vessel 22, which vessel 22 is provided with agitating means not shown. Finely divided $TiF_4$ from source 23 is passed by way of line 24 into vessel 22. Many methods are known for introducing a finely divided solid into a line and for conveying the material into a closed vessel, e. g., storage 23 may be equipped with a star valve at the exit thereof and line 24 may be equipped with conveying flights for moving the solid. In vessel 22 the liquid HF and the $TiF_4$ form a slurry, as in this case more $TiF_4$ is used than is soluble in the liquid HF. This slurry is passed from vessel 22 into line 25 where it meets the feed from line 13.

In this illustration there are used 300 volume percent of liquid HF based on xylene in the feed, 2 mols of $TiF_4$ per mol of xylene present in the feed and 1 mol of $TiF_4$ per mol of ethylbenzene present in the feed. The contents of line 25 are passed into mixer 27, which mixer is provided with a heat exchange coil 28. The reaction of the HF, $TiF_4$ and xylene to form the complex is exothermic and the heat exchange coil 28 is provided to enable the temperature of the reaction mixture to be controlled. In mixer 27 the liquid HF, $TiF_4$ and feed are agitated and form a single homogeneous liquid phase consisting essentially of liquid HF, complexed-xylene, free-xylene and ethylbenzene.

The reaction mixture is passed from mixer 27 through line 29 into reactor 31. Reactor 31 is provided with a heat exchange coil 32. In this example the reaction is carried out at a temperature of about 250° F. for a reaction time of about 10 minutes.

The contents of reactor 31 are passed through line 33, heat exchanger 34 and line 36 into stripper 37 which is provided with internal heater 38. In stripper 37 the complex is decomposed by removing the HF. In order to avoid the formation of undesirable by-products through disproportionation and cracking, the removal of the HF is carried out under vacuum. The HF removal operation is facilitated by the use of a stripping agent. Here butane from source 41 is passed by way of line 42 into stripper 37 near the bottom thereof. The stripping agent should be substantially inert to the catalytic action of HF.

The HF and butane vapors pass out of stripper 37 through line 46, vacuum pump 47, line 48 into cooler 49. In cooler 49 the HF and butane are condensed and the liquid is passed by way of line 51 into settler 52. The upper layer of butane is separated from the lower layer of HF in settler 52 and is recycled to line 42 by way of line 53 and other lines not shown. The lower HF layer is withdrawn from settler 52 by way of valved line 54.

In the bottom of stripper 37 there appears upon the removal of the HF a slurry of extremely finely divided $TiF_4$ in the hydrocarbon reaction products. The particle size of the $TiF_4$ varies somewhat with the operation of stripper 37 and may in some cases be almost colloidal in nature. The slurry of $TiF_4$ and hydrocarbons is withdrawn from stripper 37 by way of valved line 56 and is passed into filter 57. Filter 57 may be any type of HF-resistant and HF-vapor tight filter which is adapted to the removal of extremely finely divided solids. Instead of a filter a centrifugal separator may be used. The $TiF_4$ is retained in filter 57 and the hydrocarbons are passed into valved line 59. It is to be understood that even though only one filter is shown, for continuous operation two or more filters would be used.

The $TiF_4$ is removed from filter 57 by means of a backwashing operation with liquid HF from line 54. The slurry of liquid HF and $TiF_4$ is passed from filter 57 by way of valved line 61 to vessel 22 for reuse in the process.

The hydrocarbons pass out of filter 57 through valved line 59 into fractionator 66, which is provided with reboiler 67. In fractionator 66, benzene, toluene, xylene and very small amounts of ethylbenzene are taken overhead through line 68. Remaining in the bottom of fractionator 66 is a mixture of trimethylbenzene, diethylbenzene, ethylxylene and tetramethylbenzene. These higher boiling aromatic hydrocarbons are withdrawn from fractionator 66 by way of line 69 and are sent to fractionator 71.

Fractionator 71 is provided with reboiler 72. In fractionator 71 a high purity mesitylene fraction is taken overhead by way of line 73 and is sent to storage not shown. The bottom fraction of higher boiling diethylbenzene, ethylxylene, tetramethylbenzene, etc. fraction is withdrawn from fractionator 71 by way of line 74 and is sent to storage not shown. The overhead material from fractionator 66 is passed through line 68 into fractionator 76 which is provided with reboiler 77.

A very high purity nitration grade benzene and toluene fraction is taken overhead and is sent to storage not shown by way of line 81. If desired, this fraction can be readily separated into a nitration grade benzene product and a nitration grade toluene product. The bottoms from fractionator 76 consist essentially of a mixture of xylenes which contains in excess of 80% of meta-xylene and a small amount of ethylbenzene. This xylene product is withdrawn from fractionator 76 through line 82 and may be sent to storage not shown by way of valved line 83; or it may be recycled to the disproportionation zone by way of valved line 84 and line 13.

Although a filter technique has been shown for the separation of $TiF_4$ from the reaction product other methods may be utilized, e. g., the slurry of $TiF_4$ and reaction products may be passed from stripper 37 through a heat exchanger and passed into a flash chamber where the hydrocarbons are taken overhead, leaving $TiF_4$ behind. The $TiF_4$ may then be removed from the flash chamber by slurrying with HF. This flashing technique may be made continuous by using two flash chambers operating alternately. Other methods of making this separation can be readily devised by those skilled in the art.

The following runs illustrate the experimental procedure used and the results obtainable by this process. The runs were carried out in a 1570 ml. carbon steel autoclave fitted with a 1725 R. P. M. stirrer. The desired amounts of $TiF_4$, xylene and liquid HF were added to the reactor. The temperature of the reactor contents was maintained at a selected temperature for a selected reaction time. The contents of the reactor were withdrawn into a Dry-Ice cooled flask containing crushed ice. The flask containing the reaction products was allowed to warm to room temperature. The supernatant hydrocarbons—displaced from their $TiF_4$–HF complexes by the water—were separated from the aqueous acid phase. The hydrocarbons were washed with dilute aqueous caustic to remove traces of HF. The reaction products were fractionated to a number of close boiling cuts by means of a 20 theoretical plate column. Each cut was analyzed by ultraviolet absorption or infrared absorption, together with refractive index and specific gravity measurements. The data for Runs I and II are presented below:

| Run No. | I | | II | |
|---|---|---|---|---|
| Temperature, °F | 225 | | 221 | |
| Contact Time, Minutes | 30 | | 15 | |
| | ml. | mols | ml. | mols |
| Reactor Charge: | | | | |
| p-xylene | 200 | 1.6 | 200 | 1.6 |
| HF | 500 | 25 | 500 | 25 |
| $TiF_4$ | 37 g. | 0.3 | 397 g. | 3.2 |
| Product Distribution, mol percent: | | | | |
| Benzene | | | 2.4 | |
| Toluene | 14.9 | | 23.3 | |
| Xylenes | 68.4 | | 45.6 | |
| Trimethylbenzenes | 13.0 | | 22.8 | |
| Tetramethylbenzenes | 3.7 | | 5.9 | |
| Trimethylbenzenes, Composition, mol percent: | | | | |
| 1,2,3- | Slight | | Trace | |
| 1,2,4- | (1) | | Trace | |
| 1,3,5- | (1) | | 100— | |
| Xylenes, Composition, mol percent: | | | | |
| o-xylene | 16 | | 6 | |
| m-xylene | 58 | | 88 | |
| p-xylene | 26 | | 6 | |

[1] Approximately equal amounts.

The data on these two runs show clearly the beneficial effect of operating in a single homogeneous phase. Run II shows that not only is the degree of conversion to trimethylbenzene increased, but also the trimethylbenzene product is substantially pure mesitylene.

This application is a continuation-in-part of our application S. N. 258,918, filed November 29, 1951, and entitled "Refining of Hydrocarbon Oils with HF and $TiF_4$."

Having described the invention, what is claimed is:

1. A process for the disproportionation of a xylene, which process comprises contacting under substantially anhydrous conditions said xylene at a temperature above 185° F. with an effective amount of $TiF_4$ and an amount of liquid HF sufficient to form an HF-rich phase for a time sufficient to produce an appreciable amount of trimethylbenzene, and removing HF and $TiF_4$ from the trimethylbenzene containing hydrocarbon product.

2. The process of claim 1 wherein the feed to the process consists essentially of a mixture of $C_8$ aromatics.

3. The process of claim 1 wherein said $TiF_4$ is present in an amount between about 0.1 and 5 mols per mol of xylene present in said feed.

4. The process of claim 1 wherein said liquid HF is present in an amount between about 40 and 1,000 volume percent, based on xylene in said feed.

5. The process of claim 1 wherein the temperature of contacting is between 185° and 500° F.

6. A process for the preparation of trimethylbenzene by the disproportionation of a xylene, which process comprises contacting under substantially anhydrous conditions a feed containing a xylene at a temperature between about 225° and 325° F. with between about 0.1 and 5 mols of $TiF_4$ per mol of xylene in said feed and between about 40 and 1,000 volume percent of liquid HF, based on xylene in said feed, for a time sufficient to produce an appreciable amount of trimethylbenzene, and removing the HF and $TiF_4$ from the trimethylbenzene containing hydrocarbon product.

7. The process of claim 6 wherein the liquid HF is present in an amount between about 100 and 500 volume percent.

8. The process of claim 6 wherein the time of contacting is between about 5 minutes and 60 minutes, the longer time corresponding to the lower temperature.

9. The process of claim 6 wherein said feed consists essentially of a mixture of $C_8$ aromatics.

10. The process of claim 6 wherein said feed does not contain any substantial proportion of benzene.

11. The process of claim 6 wherein said feed does not contain any substantial proportion of toluene.

12. A process for the preparation of a trimethylbenzene product containing a predominant amount of mesitylene, which process comprises contacting under substantially anhydrous conditions a xylene with an amount of $TiF_4$ and an amount of liquid HF sufficient to form a single liquid homogeneous phase of feed xylene, HF and $TiF_4$ at a temperature above 185° F. and below about 500° F., for a time sufficient to produce a trimethylbenzene product wherein mesitylene is the predominant isomer, and separating the HF and $TiF_4$ from the product hydrocarbons.

13. A process for the preparation of high purity mesitylene by the disproportionation of a xylene, which process comprises contacting under substantially anhydrous conditions said xylene at a temperature between about 225° and 325° F. with an amount of liquid HF between about 100 and 500 volume percent, based on said xylene, and an amount of $TiF_4$ between about 1.7 mols per mol of said xylene and the limit of solubility of said $TiF_4$ in the HF phase, for a time sufficient to produce a product wherein the trimethylbenzene portion is a high purity mesitylene, and separating the high purity mesitylene from the HF, $TiF_4$ and other product hydrocarbons.

14. The process of claim 13 wherein said feed is para-xylene.

15. The process of claim 13 wherein the time of contacting is between about 5 minutes and 60 minutes, the longer time corresponding to the lower temperature.

16. The process of claim 15 wherein the amount of $TiF_4$ is about 2 mols per mol of said xylene.

17. A process for the production of mesitylene, which process comprises contacting under substantially anhydrous conditions a xylene in the absence of any substantial proportion of a hydrocarbon selected from the class consisting of benzene and toluene, with liquid HF in an amount sufficient at least to form a single liquid phase and with about 2 mols of $TiF_4$ per mol of said xylene at a temperature between above 185° and 500° F. under a pressure sufficient at least to maintain a liquid phase, for a time sufficient to produce a trimethylbenzene product containing substantially only mesitylene, and recovering trimethylbenzene from the HF, and $TiF_4$ and other product hydrocarbons.

18. The process of claim 17 wherein the temperature of contacting is between about 225° and 325° F. and the time of contacting is between about 5 minutes and 60 minutes, the longer time corresponds to the lower temperature.

References Cited in the file of this patent

UNITED STATES PATENTS

| Number | Name | Date |
|---|---|---|
| 2,514,866 | Hovey | July 11, 1950 |
| 2,564,073 | Lien et al. | Aug. 14, 1951 |